(12) United States Patent
Boyarski

(10) Patent No.: US 9,927,530 B2
(45) Date of Patent: Mar. 27, 2018

(54) GPS-AIDED INERTIAL NAVIGATION METHOD AND SYSTEM

(71) Applicant: ISRAEL MILITARY INDUSTRIES LTD., Ramat Hasharon (IL)

(72) Inventor: Shmuel Boyarski, Herzliya (IL)

(73) Assignees: ISRAEL MILITARY INDUSTRIES LTD., Ramat Hasharon (IL); IMI Systems Ltd., Ramat HaSharon (IL)

( * ) Notice: Subject to any disclaimer, the term of this patent is extended or adjusted under 35 U.S.C. 154(b) by 60 days.

(21) Appl. No.: 14/904,807

(22) PCT Filed: Sep. 9, 2015

(86) PCT No.: PCT/IL2015/050921
§ 371 (c)(1),
(2) Date: Jan. 13, 2016

(87) PCT Pub. No.: WO2016/042545
PCT Pub. Date: Mar. 24, 2016

(65) Prior Publication Data
US 2016/0223683 A1 Aug. 4, 2016

(30) Foreign Application Priority Data
Sep. 16, 2014 (IL) .......................... 234691

(51) Int. Cl.
*G01S 19/47* (2010.01)
*G01S 19/03* (2010.01)
(Continued)

(52) U.S. Cl.
CPC .............. *G01S 19/47* (2013.01); *G01C 21/16* (2013.01); *G01C 21/165* (2013.01); *G01C 21/28* (2013.01);
(Continued)

(58) Field of Classification Search
CPC .......... G01S 19/47; G01S 19/03; G01S 19/40; G01S 19/19; G01C 21/16; G01C 21/165; G01C 21/28
See application file for complete search history.

(56) References Cited

U.S. PATENT DOCUMENTS 6,424,914 B1 * 7/2002 Lin ....................... G01C 21/165
701/472
8,019,538 B2 * 9/2011 Soehren ............... G01C 21/165
701/510
(Continued)

OTHER PUBLICATIONS

Bancroft et al, Data Fusion Algorithms for Multiple Inertial Measurement Units, Published Jun. 29, 2011, Sensors 2011, ISSN 1424-8220, pp. 6771 thru 6798 (Year: 2011).*
(Continued)

*Primary Examiner* — Dale W Hilgendorf
(74) *Attorney, Agent, or Firm* — Harness, Dickey & Pierce, P.L.C.

(57) ABSTRACT

A GPS-aided inertial navigation method includes providing multiple sensors including multiple inertial measurement units (IMUs) and at least one global positioning system receivers and antennas (GPSs) and computer with embedded navigation software. The computer interfaces with all IMUs and all GPS receivers; running, in parallel, in multiple standard inertial navigation (IN) schemes; computes the mean of all the INSs to obtain a fused IN solution for the IMUs' mean location; computes the mean of all the GPS solutions to obtain a fused GPS solution for the GPS antennas' mean location; applies a lever-arm correction, with the vector from the mean IMU location to the 'mean antenna' location, to the fused GPS solution; feeds the fused IN solution and the lever-arm corrected fused GPS solution to a single navigation filter, as if there were a single IMU and a single GPS; and runs an IMU/IN/GPS correction module.

12 Claims, 9 Drawing Sheets

The proposed MANS

(51) Int. Cl.
G01S 19/40 (2010.01)
G01S 19/49 (2010.01)
G01C 21/16 (2006.01)
G01C 21/28 (2006.01)

(52) U.S. Cl.
CPC .............. *G01S 19/03* (2013.01); *G01S 19/40* (2013.01); *G01S 19/49* (2013.01)

(56) References Cited

U.S. PATENT DOCUMENTS

2005/0114023 A1* 5/2005 Williamson ......... G01C 21/165 701/472
2014/0207374 A1* 7/2014 Taylor et al. .......... G01C 21/16 701/470

OTHER PUBLICATIONS

Air Force Institute of Technology, "Using Multiple MEMS IMUs to Form a Distributed Inertial Measurement Unit," Thesis, Ryan Hanson, Mar. 2005.
Journal of Basic Engineering, "A New Approach to Linear Filtering and Prediction Problems," R. E. Kalman, Mar. 1960.
Proceedings of the 53rd Israel Annual Conference on Aerospace Sciences, "Optimal Fusion of Multiple Sensors with a Common External Update," Ilia Rapoport et al., Mar. 2013.
Air Force Institute of Technology, "Design and Analysis of a Navigation System Using the Federated Filter," Thesis, Stephen J. Delory, Jun. 1996.
Air Force Institute of Technology, "Comparison of a Distributed Kalman Filter Versus a Centralized Kalman Filter With Fault Detection Considerations," Thesis, Paul J. Lawrence Jr., Jul. 1993.
"Federated Filter for Fault-Tolerant Integrated Navigation," Neal A. Carlson, pp. 265-280.
"Information-Sharing Approach to Federated Kalman Filtering," Neal A. Carlson.
IET Control Theory Applications, vol. 7, Issue 4, pp. 483-501, "Distributed Kalman Filtering: A Bilbiographic Review," Vlagdi S. Mahmoud et al., 2013.
"Federated Filter for Computer-Efficient, Near-Optimal Gps Integration," Neal A. Carlson.
IEEE Transactions on Aerospace and Electronics Systems, vol. 26, No. 3, "Federated Square Root Filter For Decentralized Parallel Processes," Neal A. Carlson, May 1990.
IEEE Transactions on Aerospace and Electronic Systems, vol. 35, No. 3, "Spacecraft Attitude/Rate Estimation Using Vector-Aided GPS Observations," Yaakov Oshman, Jul. 1999.
Dynamics of Atmospheric Flight, Chapter 4, pp. 104-151, Bernard Etkin.
International Journal of Control, Automation, and Systems, vol. 1, No. 4, pp. 444-452, "Centralized Kalman Filter With Adaptive Measurement Fusion: Its Application to a GPS/SDINS Integration System with an Additional Sensor," Tae-Gyoo Lee, Dec. 2003.
Proceedings of the 15th Mediterranean Conference on Control & Automation, "Federated Filtering for Fault Tolerant Estimation and Sensor Redundancy Management in Coupled Dynamics Distributed Systems," A. Edelmayer et al., Jul. 2007.
International Search Report and Written Opinion dated Dec. 27, 2015 regarding PCT/IL2015/050921.
ION GNSS, Session D2, "Multiple IMU Integration for Vehicular Navigation," Jared B. Bancroft, Sep. 2009.
University of Calgary Geomatics Engineering, UCGE Reports, No. 20320, "Multiple Inertial Measurement Unit Integration for Pedestrian Navigation," Jared B. Bancroft, Dec. 2010.

* cited by examiner

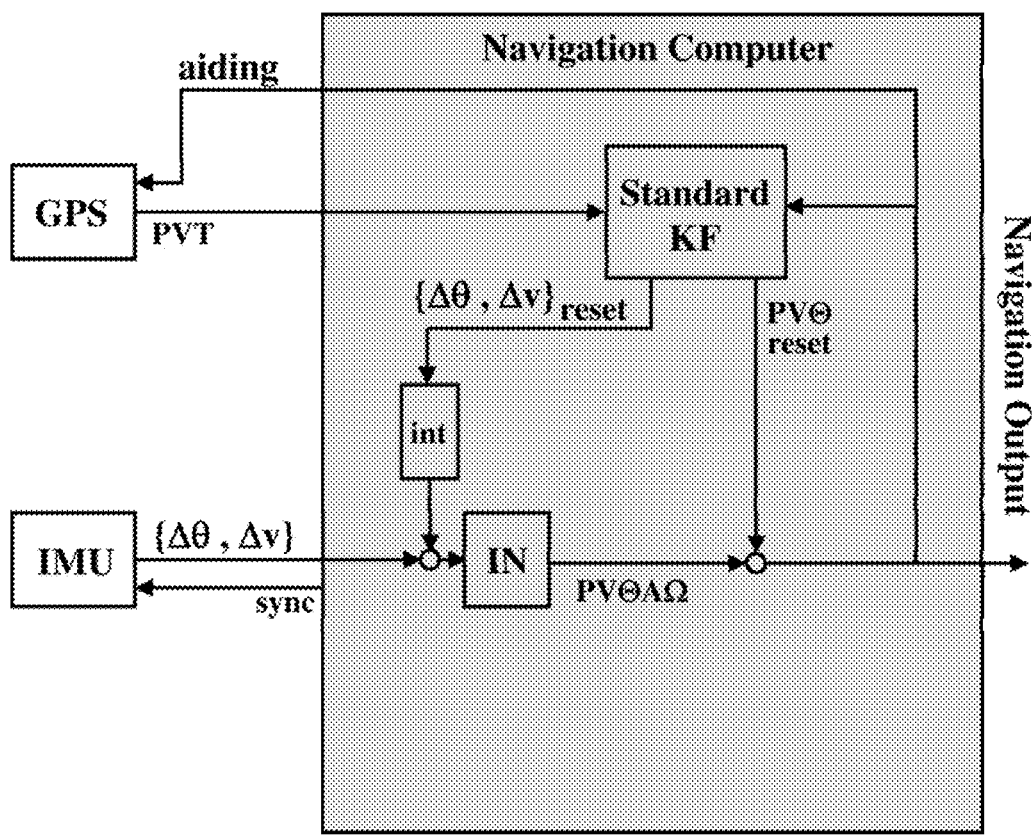
Figure 1: The baseline INS (Prior art)

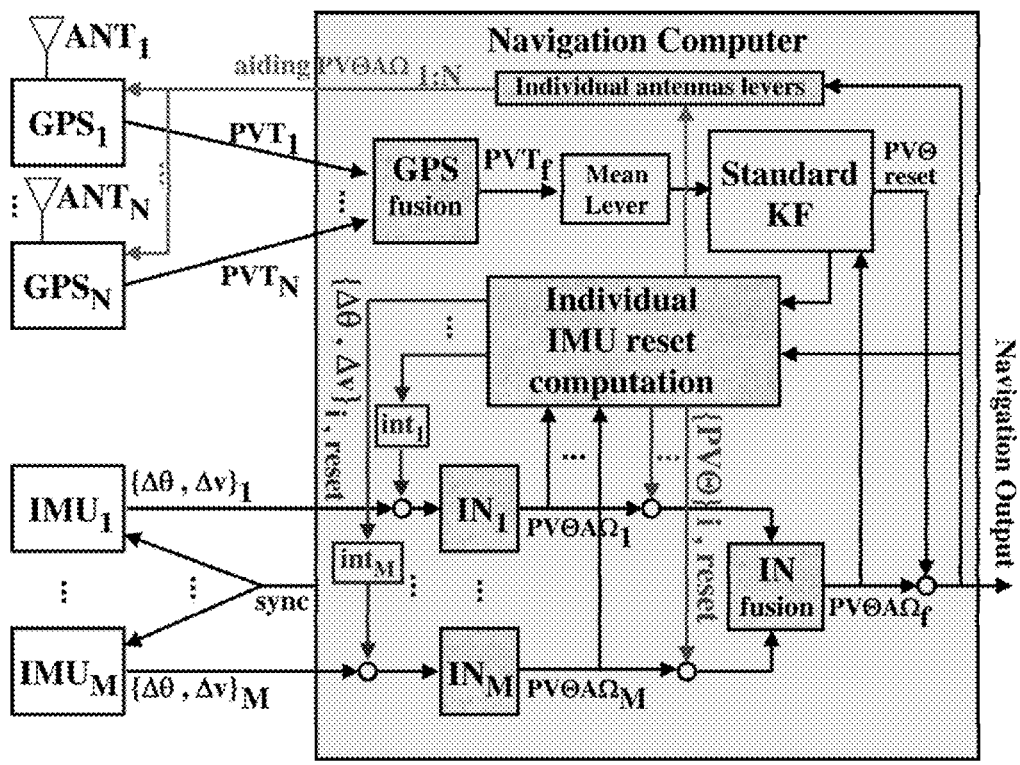
Figure 2: The proposed MANS

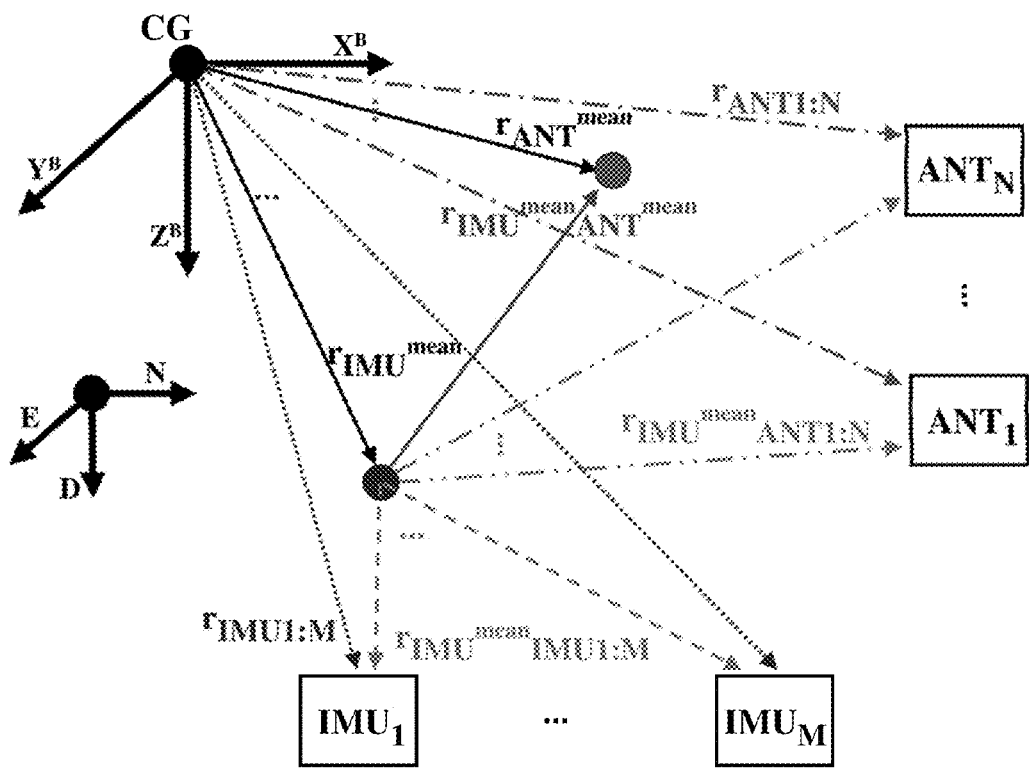
Figure 3: Body locations and vectors (see vectors nomenclature)

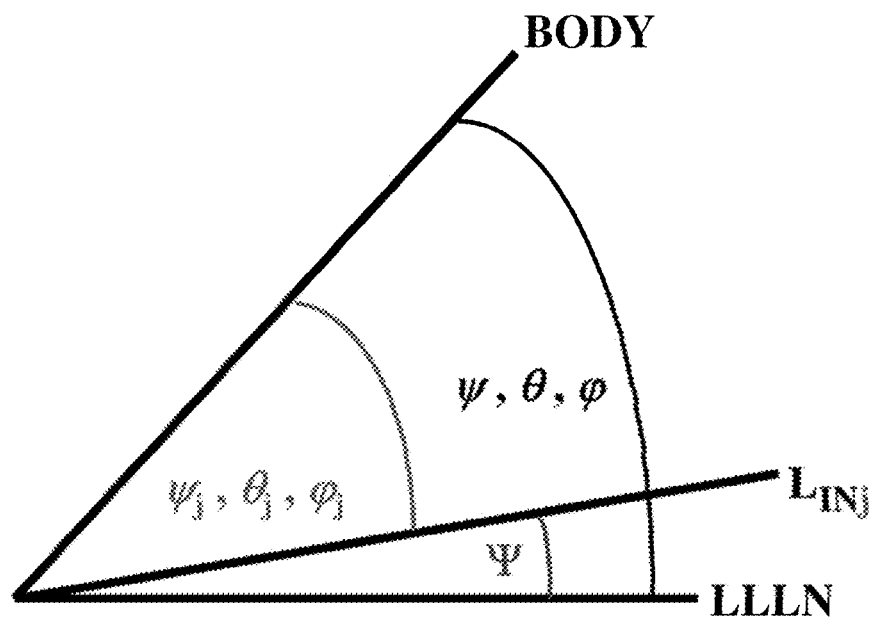
Figure 4: Attitude-outputs and attitude-errors

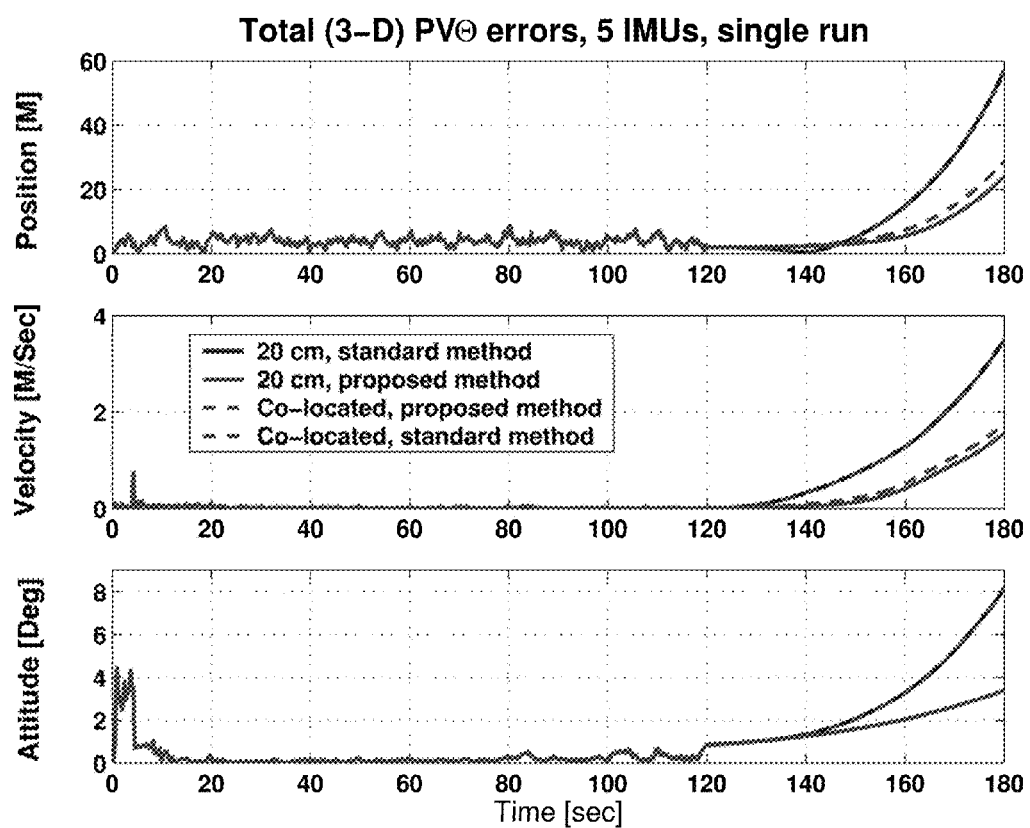
Figure 5: $PV\Theta$ errors, single run, 2 NAV schemes, 2 HW configurations

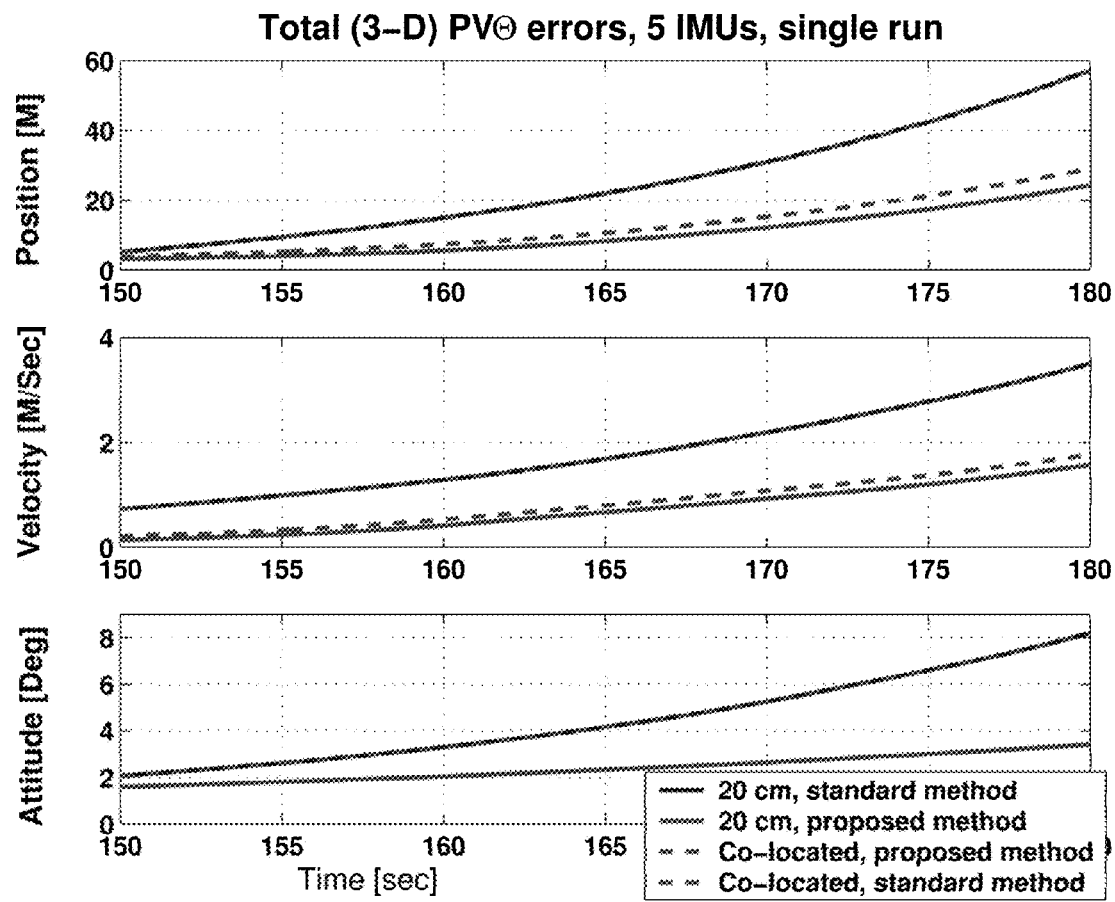
Figure 6: Zoom of Fig. 5

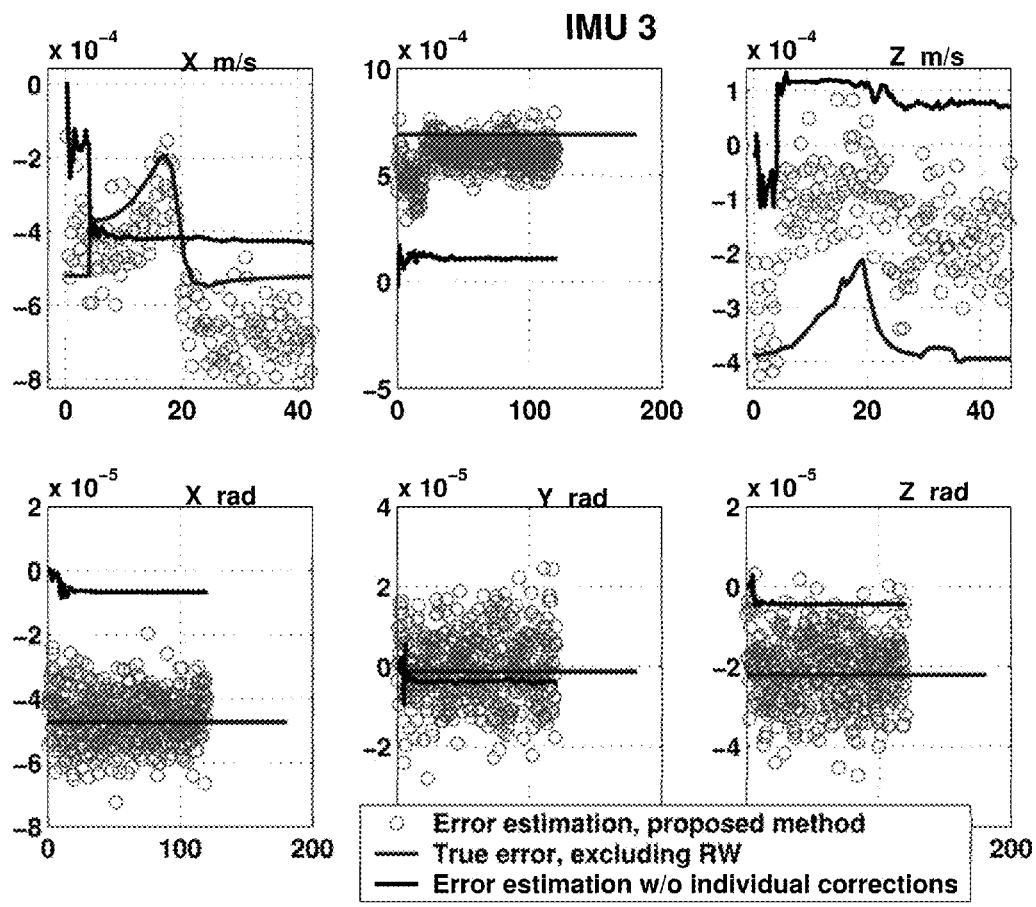
Figure 7: Off-center IMU errors: true, and estimated by both methods

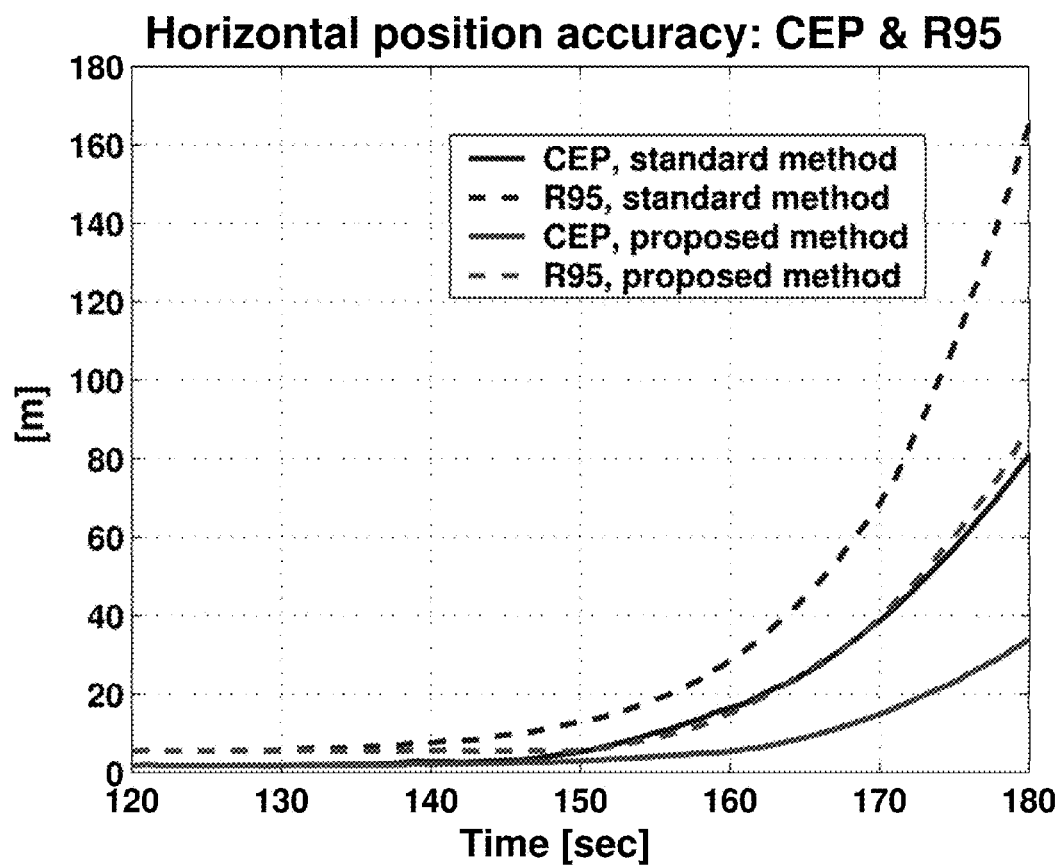
Figure 8: Horizontal CEP and R95 comparison, Monte-Carlo

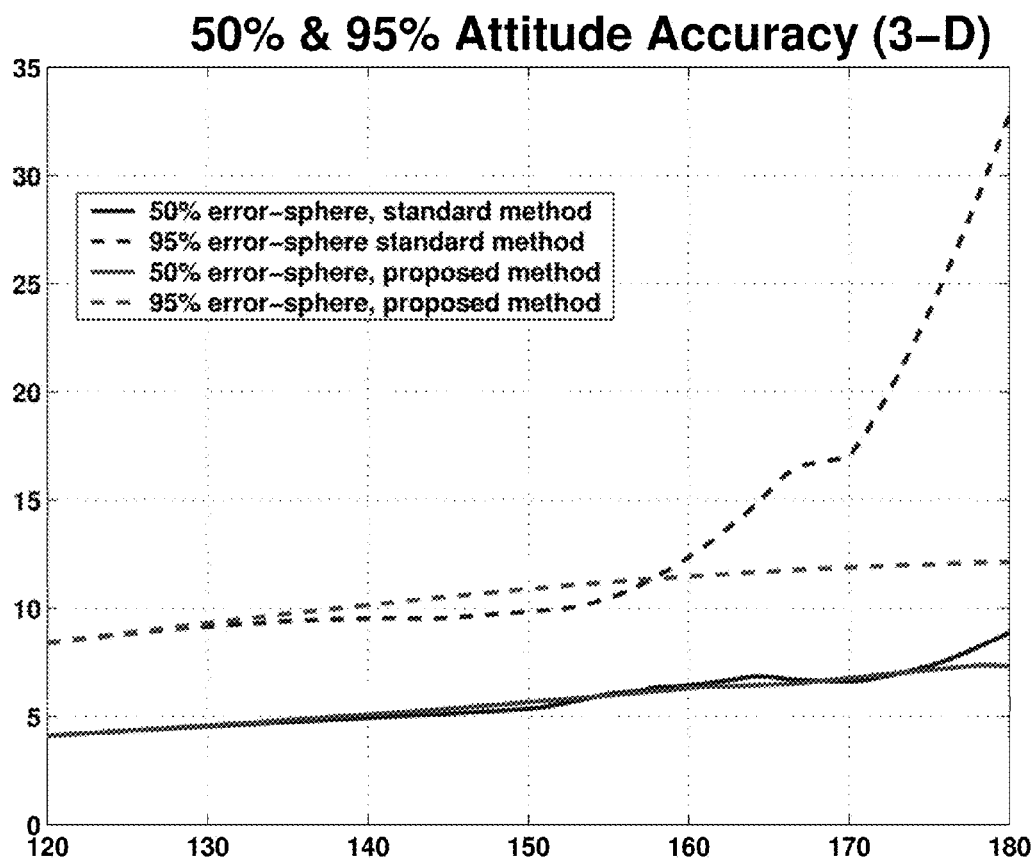
Figure 9: Attitude errors, 2 NAV schemes, Monte-Carlo

GPS-AIDED INERTIAL NAVIGATION METHOD AND SYSTEM

CROSS-REFERENCE TO RELATED PATENT APPLICATIONS

This patent application is a U.S. National Phase Application under 35 U.S.C. 371 of International Application No. PCT/IL2015/050921, filed on 9 Sep. 2015, which claims priority from Israel Patent application 234691, filed on 16 Sep. 2014, the contents of which are incorporated by reference in their entirety.

FIELD OF THE INVENTION

The present invention concerns a multi-sensor (multi-IMU and multi-GPS) GPS-aided inertial navigation system and method.

BACKGROUND OF THE INVENTION

The subject of federated filtering, and specifically federated navigation with multiple IMUs, has received considerable attention over the past three decades. The paper by M. S. Mahmoud and H. M. Khalid, entitled "Distributed Kalman filtering: a bibliographic review", in Control Theory & Applications, IET, Volume 7, Issue 4, 2013, Digital Object Identifier 10.1049/iet-cta.2012.0732, contains a broad systematic review of distributed Kalman filtering, not necessarily in the context of navigation. The seminal works of Carlson, "Information-Sharing Approach to Federated Kalman Filtering", Proceedings of the 1988 IEEE National Aerospace and Engineering Conference (NAECON 88), p. 1581, Dayton, Ohio, 1988, "Federated Filter for Fault-Tolerant Integrated Navigation Systems", IEEE Position, Location, and Navigation Symposium, pp. 110-119, Orlando, Fla., 1988, "Federated square root filter for decentralized parallel processes", IEEE Trans, on Aerospace and Electronic Systems, Vol. 26(3), pp. 517-525, 1990, "Federated filter for computer efficient near-optimal GPS integration", IEEE Trans, on Aerospace and Electronic Systems, pp. 306-314, 1996, and "Federated Filter for Distributed Navigation and Tracking Applications", ION 58th AM, pp. 340-353, 2002, have introduced decentralized/federated filtering ideas and techniques into the realm of navigation. These navigation approaches were thoroughly investigated at the USAF institute of technology, P. J. Lawrence, "Comparison of a Distributed Kalman Filter Versus a Centralized Kalman Filter with Fault Detection Considerations", AFIT MS Thesis, Wright-Patterson AFB, AFIT/GE/ENG/93S-06, 1993; and S. J. Delory, "Design and Analysis of a Navigation System Using The Federated Filter", AFIT MS Thesis, Wright-Patterson AFB, AFIT/GSO/IENG/95D-02, 1995. Some more recent works on this subject are exemplified in A. Edelmayer and M. Miranda, "Federated filtering for fault tolerant estimation and sensor redundancy management in coupled dynamics distributed systems", Proceedings of the 15th Med. Conf. on Control & Automation, Athens, July 2007; I. Rapoport, A. Brandes and H. Kraus, "Optimal Fusion of Multiple Sensors with a Common External Update", Proceedings of the 53rd Israel Annual Conference on Aerospace Sciences, Tel-Aviv & Haifa, Israel, March 2013; and T.-G. Lee, "Centralized Kalman Filter with Adaptive Measurement Fusion: its Application to a GPS/SDINS Integration System with an Additional Sensor", International Journal of Control, Automation, and Systems, Vol. 1(4), pp. 444-452, December 2003. P. G. Savage, "Strapdown Inertial Navigation Integration Algorithm Design Part 1: Attitude Algorithms", Journal of Guidance, Control, and Dynamics, Vol. 21(1), pp. 19-28 January-February 1998; P. G. Savage, "Strapdown Inertial Navigation Integration Algorithm Design Part 2: Velocity and Position Algorithms", Journal of Guidance, Control, and Dynamics, Vol. 21(2), pp. 208-318, March-April 1998; P. G. Savage, "A Unified Mathematical Framework for Strapdown Algorithm Design", Journal of Guidance, Control, and Dynamics, Vol. 29(2), pp. 237-249, March-April 2006; P. G. Savage, "Strapdown Analytics", chap. 4.6, 6, 15.2, Strapdwon Associates, 2000; and D. H. Titterton and J. L. Weston, "Strapdown Inertial Navigation Technology", IEE Radar, Sonar, Navigation and Avionics Series 5, 1997, are encompassing papers and books on inertial navigation. R. E. Kalman, "A New Approach to Linear Filtering and Prediction Problems", Transactions ASME 82D, pp. 33-45, 1960; P. S. Maybeck, "Stochastic Models, Estimation and Control", Vol. 1, Navtech Book & Software Store, 1994; and Y. Bar-Shalom, X.-Rong Li and T. Kirubarajan, "Estimation with Applications To Tracking and Navigation", John Wiley & Sons, 2001 are the cornerstone paper on Kalman filtering and two well-known practical books on the subject. The basic kinematic and dynamic relationships between points within a rigid-body appear in numerous sources, e.g. B. Etkin, "Dynamics of Atmospheric Flight", John Wiley & Sons, 1972.

BRIEF DESCRIPTION OF THE DRAWINGS

FIG. 1 is a schematic diagram of a prior art single-IMU/single-GPS navigation system.

FIG. 2 is a schematic diagram depicting an embodiment of the present multi-IMU/multi-GPS system and method (that may be named MANS, multi-agent navigation system).

FIG. 3 depicts a schematic geometry of the IMUs and GPS antennas and the vectors between the various entities.

FIG. 4 depicts the 'attitude errors' addressed in the description.

FIGS. 5-9 provide simulation results, in the form of navigation accuracy/error plots, of the present multi-IMU/multi-GPS system and method and of a compared navigation approach, explained in the simulation example section.

SUMMARY OF THE INVENTION

The present system includes a mobile rigid body ('vehicle', e.g. aircraft) on which a plurality of inertial measurement units (IMUs) and one or more GPS antennas and receivers are fixedly installed. A navigation computer (NC) completes the navigation hardware, and interfaces all the above hardware elements. The present GPS-aided inertial navigation system and method fuse the data from all available sensors to produce the navigation solution (position, velocity, attitude). It is assumed that one has already developed a single-IMU/single-GPS INS, and one wishes to modify it and create a multi-GPS/multi-IMU INS with minimal software changes and with minimal additional computational burden. These 'minimality requirements' practically exclude prior art federated navigation. Compared to a 'baseline' single-IMU/single-GPS inertial navigation system (INS), the present system and method provide (with IMUs and GPS receivers similar to the IMU and receiver of the baseline INS) better navigation accuracy with minimal additional algorithmic and computational complexity. The present method only minimally deviates from a single-IMU/single-GPS GPS-aided inertial navigation scheme, and results in performance and cost benefits associated with a multi-agent navigation system. The cost benefit stems from the fact that several relatively low-accuracy and inexpensive IMUs and GPS receivers can deliver navigation accuracy that otherwise (with a single-IMU/single-GPS INS) requires high-end and very expensive IMU and GPS receiver.

The present system and method provide a navigation approach that differs from past research and practice in several ways. First, there is only one navigation filter, and it practically is a basic 'standard' single-IMU/single-GPS navigation filter, except for minute filter-tuning changes. This filter does not have more states than a single-IMU/single-GPS navigation filter, and accommodates only one (fused) IN solution and one (fused) GPS solution, as if there were one IMU and one GPS receiver in the system. Further, despite including only a single 'standard' filter, the invention includes individual corrections and resets to all the IMUs and INs, and individual aidings to all the GPS receivers, similarly to the prior art, multi-filter federated navigation. And, the above is accomplished by intensive application of well-known rigid-body static, kinematic and dynamic internal relationships, rather than by yet another complex filtering scheme. Key to the individual sensor corrections is an innovative algorithm that computes a real-time least-squares solution for the body's angular acceleration. Fault detection/isolation, not discussed here, can also be supported within the scope of the invention.

The computational burden and software complexity here are just a little greater than in a single-IMU/single-GPS INS, however both the burden and complexity are significantly smaller than with federated navigation, which is the prior art of navigating with multiple IMUs, where there are multiple filters, usually a dedicated filter per each IMU plus a central filter.

In accordance with embodiments of one aspect of the present invention there is provided a multi-sensor GPS-aided inertial navigation method. The method includes providing multiple sensors, including multiple inertial measurement units (IMUs) and one or more global positioning system receivers and antennas (GPSs); and providing a navigation computer (NC) with embedded navigation software. The below activities of the NC may be performed by a computer which is not navigation-dedicated, however has the required hardware interfaces and navigation software.

The NC performs the following activities: interfacing with all IMUs and all GPS receivers; running, in parallel, multiple standard inertial navigation (IN) schemes, one per each IMU; computing the mean of all the INs, thus obtaining a fused IN solution for the IMUs' mean location ('mean IMU' location); computing the mean of all the GPS solutions, thus obtaining a fused GPS solution for the GPS antennas' mean location ('mean antenna' location); applying standard lever-arm corrections, with the vector from the 'mean IMU' location to the 'mean antenna' location, to the fused GPS solution; feeding the fused IN solution and the lever-arm corrected fused GPS solution to a single navigation filter, as if there were a single IMU and a single GPS; and running an IMU/IN/GPS correction module. The correction module is based on rigid-body physics and computes appropriate individual: (i) acceleration and angular rate corrections for each IMU; (ii) position, velocity and attitude corrections for each IN, and (iii) position, velocity, attitude, acceleration and angular rate aiding-message for each GPS receiver.

In some embodiments, the method uses an inertial navigation (IN) scheme per each IMU.

In some embodiments, the method uses only one navigation filter to accommodate one fused IN solution and one fused GPS solution, as if there were a single IMU and a single GPS.

In some embodiments, all corrections and aiding-messages are performed individually for each sensor and IN-output.

In some embodiments, all the corrections and aiding-messages are computed by algorithms based on rigid-body physics.

In some embodiments, the algorithms compute a real-time least-squares solution for the body's angular acceleration.

In some embodiments, individual IMU-corrections are computed as increments to prior corrections, and integrated.

In some embodiments, individual IMU-corrections are computed wholly, after each filter-update anew, without integrators.

In some embodiments, the computation of individual corrections to the sensors uses angular rate and angular acceleration lever-arm corrections, and filter-updated/lever-corrected linear accelerations at the individual IMUs' locations, to define either local IMU correction-increments (that undergo integration) or whole local IMU corrections.

In accordance with embodiments of another aspect of the present invention there is provided a GPS-aided inertial navigation system (INS). The system includes multiple IMUs, a NC with embedded navigation software, and at least one GPS receiver and antenna. The NC is configured to: (a) interface all IMUs and all GPS receivers; (b) run, in parallel, multiple standard inertial navigation (IN) schemes, one per each IMU; (c) compute the mean of all INs, thus obtaining a fused IN solution for the IMUs' mean location ('mean IMU' location); (d) compute the mean of all GPS solutions, thus obtaining a fused GPS solution for the GPS antennas' mean location ('mean antenna' location); (e) apply lever-arm corrections, with the vector from the 'mean IMU' location to the 'mean antenna' location, to the fused GPS solution; (f) feed the fused IN solution and the lever-arm corrected fused GPS solution to a single navigation filter, as if there were a single IMU and a single GPS; and (g) run an IMU/IN/GPS correction module. The correction module is based on rigid-body physic and computes appropriate individual (i) acceleration and angular rate corrections for each IMU, (ii) position, velocity and attitude corrections for each IN, and (iii) position, velocity, attitude, acceleration and angular rate aiding-messages for each GPS receiver.

ACRONYMS AND DEFINITIONS

LLLN or L—the true Local-Level Local-North (LLLN) frame, where XYZ is North-East-Down (NED)
ECEF or E—Earth-Centered Earth-Fixed (ECEF) frame
BODY or B—Body-fixed frame of the rigid body, where XYZ is forward-right-down
I—the Inertial frame
CG—Center of Gravity of the rigid body, and origin of B
IN—(standard) Inertial Navigation scheme
INS—(standard) Inertial Navigation System
IMU—Inertial Measurement Unit
GPS—Global Positioning System
NC—Navigation Computer
KF—Kalman filter
HW—Hardware
MC—Monte Carlo simulation
CEP—Circular Error Probable, the radius of the circle in which 50% of the results reside R95—The radius of the circle in which 95% of the results reside
DCM—Direction Cosines Matrix
1PPS—One Pulse Per Second
$\sim \mathcal{N}(\mu, R)$—Normally (Gaussianly) distributed with mean $\mu$ and variance R
$L_{IN}$—the (erroneous) LLLN computed by the IN
$C_M^N$—DCM for transforming vectors from frame M to N
$C_L^B(\psi, \theta, \varphi)$—DCM for transforming vectors from some LLLN frame L (true or computed) to the body frame B, where the attitude of the body frame with respect to the LLLN frame is defined by the western standard Euler angles triplet $\psi, \theta, \varphi$
$\Psi = [\Psi^R, \Psi^P, \Psi^Y]^T$—the (minute) angles vector relating $L_{IN}$ to LLLN; the RPY (Roll-Pitch-Yaw) attitude-errors of the IN
$C_B^E$—DCM for transforming vectors from the body frame B to ECEF frame E
PVT—Position (3-vectors), Velocity (3-vectors), Time
PV$\Theta$A$\Omega$—Position, Velocity, attitude ($\Theta$), Acceleration, and angular rate ($\Omega$) (all 3-vectors)
$\Delta\theta, \Delta v$—attitude and velocity increments (IMU outputs)
$(\;)_f$—( ) fused
$(\;)_X^Z$—( ) of entity X, in frame Z
$(\;)_{YX}^Z$—( ) of entity X, relative to frame Y, in frame Z
$\Omega_{IB}^B$—angular velocity ($\Omega$) of frame B relative to frame I, expressed in frame B (the superscript)
$r_{I_j}$—the position-vector of IMU No. j (j=1, ..., M), in B ($r_{IMU_j}$ in FIG. 3)
$\bar{r}_I$—the mean of $r_{I_j}$, j=1, ..., M ('mean IMU' location), in B ($r_{IMU^{mean}}$ in FIG. 3)
$r_{A_i}$—the position-vector of Antenna No. i (i=1, ..., N), in B ($r_{ANT_i}$ in FIG. 3)
$\bar{r}_A$—the mean of $r_{A_i}$, i=1, ..., N ('mean antenna' location), in B ($r_{ANT^{mean}}$ in FIG. 3)
$r_{IA}$—vector in B from the 'mean IMU' location $\bar{r}_I$ to the 'mean antenna' location $\bar{r}_A$ ($r_{IMU^{mean}ANT^{mean}}$ in FIG. 3)
$r_{IA_i}$—vector in B from the 'mean IMU' location to the $i^{th}$ antenna, i=1, ..., N ($r_{IMU^{mean}ANT_i}$ in FIG. 3)
$r_{II_j}$—vector in B from the 'mean IMU' location to the $j^{th}$ IMU, j=1, ..., M ($r_{IMU^{mean}IMU_j}$, FIG. 3)

DESCRIPTION OF EMBODIMENTS OF THE INVENTION

The Baseline INS

The INS assumed to exist (FIG. 1), and to be at hand and well-recognized, includes a single standard IMU, which provides coning and sculling-corrected $\{\Delta\theta, \Delta v\}$; a single GPS receiver (with a single antenna), which provides $\{P, V, T\}$ fixes; and a navigation computer which runs both an inertial navigation (IN) scheme and a standard navigation filter with the 15 standard error states $\{PV\Theta A\Omega\}$. The filter customarily is a Kalman filter [KF], but may be some other filter, e.g. an unscented KF, an $H_\infty$ filter, a particle filter, etc. The position and velocity GPS fixes are corrected for the lever-arm effect of the body-vector between the IMU and antenna locations. These lever-arm corrections are performed, in the standard fashion, before passing the fixes to the filter. The computer uses the 1PPS signal from the GPS receiver, together with the receiver's time message, to adapt its own clock to GPS time and identify the fixes' timings. The computer also sends sync signals to the IMU, to ensure timely IMU-output arrival. Filter outputs are used to correct (reset) both IN-inputs and IN-outputs. All navigation outputs (navigation filter-corrected full PV$\Theta$A$\Omega$ solution) are sent as 'aiding' to the GPS receiver, to facilitate satellites tracking and re-acquisition.

Main Elements of the Invention

The invention (FIG. 2) includes the following computation and inter-communication activities, which are fully defined in this document (except for the first two, hardware interfaces and inertial navigation computations, which are performed as in the baseline 'standard' INS):

The navigation computer (NC) interfaces all IMUs in the same way the baseline NC interfaces its IMU, and all GPS receivers in the same way the baseline NC interfaces its GPS receiver;

The NC runs (in parallel) M standard inertial navigation (IN) schemes, one per each IMU;

The NC computes the mean of all INs, thus obtaining a fused IN solution for the IMUs' mean location;

The NC computes the mean of all GPS solutions, thus obtaining a fused GPS solution for the GPS antennas' mean location;

The NC feeds the fused IN and the fused GPS solutions (after correcting the fused GPS solution for the lever-arm between the 'mean IMU' and the 'mean antenna' locations) to a 'standard' (single-IMU/single-GPS) navigation filter (only re-tuned because of the smaller 'mean sensors' errors); and, The NC runs an individual IMU/IN/GPS correction module which, based on rigid-body physics, computes appropriate individual
$\{A, \Omega\}$—correction for each IMU,
$\{P, V, \Theta\}$—correction for each IN, and
$\{P, V, \Theta, A, \Omega\}$—aiding message for each GPS receiver, and applies these individual corrections/aidings to all IMUs, INs and GPS receivers.

GPS Fusion

With reference to FIG. 3, the mean location of the GPS antennas ('mean IMU' location, or 'IMUs center') in body axes is $$\bar{r}_A \triangleq \frac{1}{N} \sum_{i=1}^{N} r_{A_i}. \qquad (1)$$

Position-Fix Fusion

The true ECEF position of the $i^{th}$ GPS receiver is $P_{CG}^E(t) + C_B^E(t) r_{A_i}$, where $P_{CG}^E$ is the body's CG position in ECEF. Hence, a simple model of the $i^{th}$ receiver position-fix in ECEF at time t, denoted $P_{GPS_i}^E(t)$, is $$P_{GPS_i}^E(t) = P_{CG}^E(t) + C_B^E(t) r_{A_i} + v_{P_i}^E(t) \qquad (2)$$

where $v_{P_i}^E$ is the position-fix error in ECEF of the $i^{th}$ receiver, assumed here to be a zero-mean white Gaussian noise with covariance $R_{P_i}(t)$. All receivers are assumed to have the same position error statistics: $R_{P_i}(t) = R_P(t) \forall i$.

The fused GPS position-fix is obtained by summing equation (2) over the i=1, ..., N available fixes and dividing by N:

$$\bar{P}_{GPS}^E = \frac{1}{N} \sum_{i=1}^{N} P_{GPS_i}^E(t) = \qquad (3)$$

-continued $$P_{CG}^E(t) + C_B^E(t)\frac{1}{N}\sum_{i=1}^N r_{A_i} + \frac{1}{N}\sum_{i=1}^N v_{P_i}^E(t) = P_{CG}^E(t) + C_B^E(t)\bar{r}_A + \bar{v}_P^E(t)$$

where $\bar{v}_P^E$ is the mean GPS' position-noise, whose covariance is $$\bar{R}_P(t) = \frac{1}{N} R_P(t).$$

Thus, for equal receivers, the mean of the receivers ECEF position-fixes represents a (fused) ECEF position-fix $\bar{P}_{GPS}^E$ of the mean body location of the GPS antennas ($\bar{r}_A$), and $\bar{P}_{GPS}^E$ has an error covariance N times smaller than that of a single receiver. The latter fact affects the proposed navigation filter tuning. If the receivers are different, $\bar{R}_P^{-1} = \Sigma_{i=1}^N R_{P_i}^{-1}$ and $\bar{P}_{GPS}^E = \bar{R}_P \Sigma_{i=1}^N (R_{P_i}^{-1} P_{GPS_i}^E)$ should be used; $\bar{P}_{GPS}^E$ then represents a covariance-weighted 'antenna location'. Position-fix bias errors, e.g. ionospheric (residual) errors, are common to all the receivers and thus shift $\bar{P}_{GPS}^E$.

Velocity-Fix Fusion

The $i^{th}$ GPS receiver velocity-fix in ECEF at time t, denoted $V_{GPS_i}^E(t)$, is $$V_{GPS_i}^E(t) = V_{CG}^E(t) + C_B^E(t)(\Omega_{EB}^B \times r_{A_i}) + v_{V_i}^E(t) \quad (4)$$
$$= V_{CG}^E(t) + C_B^E(t)[\Omega_{EB}^B \times] r_{A_i} + v_{V_i}^E(t)$$

where $V_{CG}^E$ is the body's CG velocity in ECEF and $v_{V_i}^E$ is the velocity-fix error (noise) in ECEF of the $i^{th}$ receiver, assumed $\sim \mathcal{N}(0, R_{V_i})$. All receivers have the same velocity error statistics: $R_{V_i}(t) = R_V(t) \forall i$. Note that $\Omega_{EB}^B = \Omega_{IB}^B - \Omega_{IE}^B$, where $\Omega_{IE}^B$ is (the constant) earth rotation-rate, $\Omega_{IE}^B$ is $\Omega_{IE}^B$ in B, and $\Omega_{IB}^B$ (the body's inertial angular rate, in B) is measured (with errors) by the rate-gyros in the IMUs. The matrix $[\Omega \times]$ is the skew-symmetric (also known as cross-product) form of the vector's $\Omega = [\Omega_X \Omega_Y \Omega_Z]^T$ cross product, and defined as $$[\Omega \times] \triangleq \begin{bmatrix} 0 & -\Omega_Z & \Omega_Y \\ \Omega_Z & 0 & -\Omega_X \\ -\Omega_Y & \Omega_X & 0 \end{bmatrix} \quad (5)$$

The fused GPS velocity-fix is obtained by summing equation (4) over i=1, . . . , N and dividing by N:

$$\bar{V}_{GPS}^E = \frac{1}{N} \sum_{i=1}^N V_{GPS_i}^E(t) \quad (6)$$
$$= V_{CG}^E(t) + C_B^E(t)\Omega_{EB}^B \times \left(\frac{1}{N}\sum_{i=1}^N r_{A_i}\right) + \frac{1}{N}\sum_{i=1}^N v_{V_i}^E(t)$$
$$= V_{CG}^E(t) + C_B^E(t)\Omega_{EB}^B \times \bar{r}_A + \bar{v}_V^E(t)$$
$$= V_{CG}^E(t) + C_B^E(t)[\Omega_{EB}^B \times]\bar{r}_A + \bar{v}_V^E(t)$$

where $\bar{v}_V^E$ is the 'mean GPS' velocity-noise, of covariance $$\bar{R}_V(t) = \frac{1}{N} R_V(t).$$

Thus, the mean of the (equal) receivers ECEF velocity-fixes represents a (fused) ECEF velocity-fix $\bar{V}_{GPS}^E$ for the mean antennas body location $\bar{r}_A$, and this velocity-fix has an error covariance N times smaller than that of a single receiver (this affects the navigation filter tuning). If the receivers are different, $\bar{R}_V^{-1} = \Sigma_{i=1}^N R_{V_i}^{-1}$ and $\bar{V}_{GPS}^E = \bar{R}_V \Sigma_{i=1}^N (R_{V_i}^{-1} V_{GPS_i}^E)$ should be used.

IN Fusion

Before looking into IN fusion, note that each IN scheme is identical to the IN scheme of the baseline INS but is individually initialized, with its own best initially-known position and velocity, which may be significant for large bodies and non-rest initializations. If the body is 'small' and initially at rest, it may be practically acceptable to initialize all INs with the same position (and zero velocity). Attitude initialization is the same for all INs.

The $\{\Delta\theta, \Delta v\}$ output of each IMU is routed (after individual $\{A, \Omega\}$-corrections, as in the baseline INS; the computation of the corrections will be described later) to a dedicated standard IN scheme. The $\{P, V, \Theta\}$ output of each IN is routed (after individual $\{P, V, \Theta\}$-corrections, as in the baseline INS) to the IN fusion module; the latter also receives the corrected $\{\Delta\theta, \Delta v\}$. See FIG. 2.

Note that though individual errors of each IN will be addressed in this sub-section, and though each IN obviously 'has' an error covariance matrix, no 'local' filters operate in the navigation method of this invention. IN errors are discussed here just to show how the IMUs'-output noise parameters (that drive IN $\{P, V, \Theta\}$-errors) should be used as process-noise parameters in the re-tuning of the (single, standard) navigation filter.

IN Position-Output Fusion

IN position-output fusion is similar to GPS position-fix fusion described above. Denote by $P_{IN_j}^E$ the $j^{th}$ IN position-output in ECEF, and denote by $e_{PIN_j}^E$, its error. Then, $$P_{IN_j}^E(t) = P_{CG}^E(t) + C_B^E(t)r_{I_j} + e_{PIN_j}^E(t). \quad (7)$$

The fused IN position-output $\bar{P}_{IN}^E$ is obtained by summing equation (7) over the M INs and dividing by M:

$$\bar{P}_{IN}^E = \frac{1}{M}\sum_{j=1}^M P_{IN_j}^E(t) \quad (8)$$
$$= P_{CG}^E(t) + C_B^E(t)\frac{1}{M}\sum_{j=1}^M r_{I_j} + \frac{1}{M}\sum_{j=1}^M e_{PIN_j}^E(t)$$
$$= P_{CG}^E(t) + C_B^E(t)\bar{r}_I + \bar{e}_{PIN}^E(t)$$

Where $$\bar{e}_{PIN}^E \triangleq \frac{1}{M}\sum_{j=1}^M e_{PIN_j}^E$$

is the 'mean IN' position-error. Thus, $\bar{P}_{IN}^E$ represents a (fused) ECEF position-solution for the mean body location of the IMU's ($\bar{r}_I$), and its (un-named) error covariance is about M times smaller than that of a single IN. See I Rapoport, A Brandes and H. Kraus, "Optimal Fusion of Multiple Sensors with a Common External Update", Proceedings of the 53 Israel Annual Conference on Aerospace Sciences, Tel-Avive & Haifa, Israel, March 2013.

IN Velocity-Output Fusion

Similarly, $$V_{IN_j}^E(t) = V_{CG}^E(t) + C_B^E(t)[\Omega_{EB}^B \times]r_{I_j} + e_{VIN_j}^E(t) \quad (9)$$

$$\bar{V}_{IN}^E = \frac{1}{M}\sum_{j=1}^{M} e_{VIN_j}^E(t) \quad (10)$$

$$= V_{CG}^E(t) + C_B^E(t)\Omega_{EB}^B \times \left(\frac{1}{M}\sum_{j=1}^{M} r_{I_j}\right) + \frac{1}{M}\sum_{j=1}^{M} e_{VIN_j}^E(t)$$

$$= V_{CG}^E(t) + C_B^E(t)[\Omega_{EB}^B \times]\bar{r}_I + \bar{e}_{VIN}^E(t)$$

Here $$\bar{e}_{VIN}^E \triangleq \frac{1}{M}\sum_{j=1}^{M} e_{VIN_j}^E$$

is the 'mean IN' velocity-error and $\nabla_{IN}^E$ represents a (fused) ECEF velocity-solution for $\bar{r}_I$. The fused IN velocity error covariance is about M times smaller than that of a single IN.

IN Attitude-Output Fusion

The true $C_{LLLN}^B(\psi, \theta, \varphi)$ applies over the whole body, however each IN outputs a slightly different computed $C_{L_{IN}}^B$. For the $j^{th}$ IN, j=1, . . . , M, the following relation between the IN's attitude-outputs $\{\psi_j, \theta_j, \varphi_j\}$, its attitude-errors $\{\Psi^{R_j}, \Psi^{P_j}, \Psi^{Y_j}\}$ and the true Euler angles $\{\psi, \theta, \varphi\}$ holds (see FIG. 4):

$$C_{LLLN}^B(\psi, \theta, \phi) = \quad (11)$$
$$C_{LIN_j}^B(\psi_j, \theta_j, \phi_j) C_{LLLN}^{L_{IN_j}}(\Psi^{R_j}, \Psi^{P_j}, \Psi^{Y_j}) \Rightarrow$$
$$C_B^{L_{IN_j}} C_{LLLN}^B = C_{LLLN}^{L_{IN_j}}(\Psi^{R_j}, \Psi^{P_j}, \Psi^{Y_j}).$$

By approximating the well-known full Euler-angles DCM formulation to minute angles, $C_{LLLN}^{L_{IN}}$ can be expressed using $[\Psi^R, \Psi^P, \Psi^Y]^T$ (each normally a few milli-radians) as $$C_{LLLN}^{L_{IN}} \cong \begin{bmatrix} 1 & \Psi^Y & -\Psi^P \\ -\Psi^Y & 1 & \Psi^R \\ \Psi^P & -\Psi^R & 1 \end{bmatrix}. \quad (12)$$

Definition (5) and the latter approximation lead to the well-known result $$C_{LLLN}^{L_{IN}} \cong I - [\Psi \times]. \quad (13)$$

Hence, equation (11) can be well approximated as $$C_B^{L_{IN_j}}(\psi_j, \theta_j, \phi_j) C_{LLLN}^B(\psi, \theta, \phi) \cong I - [\Psi_j \times]. \quad (14)$$

Summing over j and dividing by M:

$$\frac{1}{M}\sum_{j=1}^{M} C_B^{L_{IN_j}}(\psi_j, \theta_j, \phi_j) C_{LLLN}^B(\psi, \theta, \phi) \cong \frac{1}{M}\sum_{j=1}^{M}(I - [\Psi_j \times]) = \quad (15)$$

$$I - \frac{1}{M}\sum_{j=1}^{M}[\Psi_j \times] = I - \left[\left(\frac{1}{M}\sum_{j=1}^{M}\Psi_j\right)\times\right] \Rightarrow \bar{C}_B^{L_{IN}} C_{LLLN}^B \cong I - [\bar{\Psi} \times].$$

$$\bar{C}_B^{L_{IN}} \triangleq \frac{1}{M}\sum_{j=1}^{M} C_B^{L_{IN_j}}$$

is the mean of the DCM-outputs of all the Ins and $$\bar{\Psi} \triangleq \frac{1}{M}\sum_{j=1}^{M}\Psi_j$$

is the IN's mean attitude-error (small-angles vector). Therefore, the fused attitude-output of the Ins, $C_B^{L_{IN}}$, has an error covariance about M times smaller than that of a single IN. A standard ortho-normalization (see P. G. Savage, "Strapdown Analytics", chap. 4.6, 6, 15.2, Strapdown Associates, 2000, section 7.1.1.3) on $C_B^{L_{IN}}$ is required.

IN Angular Rate Fusion

The true $\Omega_{IB}^B$ applies over the whole body, however each IMU outputs a slightly different measured $\Omega_j$, or $\Delta\theta_j$. The measurement model is $$\Omega_j(t) = \Omega_{IB}^B(t) + e_{\Omega IN_j}(t). \quad (16)$$

The fused IN angular-rate output is the average of all $\Omega_j$s:

$$\bar{\Omega}_{IN} = \frac{1}{M}\sum_{j=1}^{M}\Omega_j(t) = \Omega_{IB}^B(t) + \frac{1}{M}\sum_{j=1}^{M} e_{\Omega IN_j}(t) = \Omega_{IB}^B(t) + \bar{e}_{\Omega IN}(t). \quad (17)$$

$\bar{e}_{\Omega IN}$ is the 'mean IN' angular-rate error; it has a covariance M times smaller than that of a single IN.

IN Acceleration Fusion

A fundamental physical fact about rigid bodies (see e.g. B. Etkin, "Dynamics of Atmospheric Flight", John Wiley & Sons; 1972) is that the inertial linear acceleration expressed in the body frame of a fixed arbitrary point D in the body, $a_{ID}^B$, defined by the fixed position-vector $r_D = [x, y, z]^T$ in frame B, where the origin O of B is the body's CG, is related to the inertial linear acceleration of the CG, $a_{IO}^B$, through the body's inertial angular velocity $\Omega_{IB}^B$ and the body's inertial angular acceleration $\dot{\Omega}_{IB}^B$:

$$a_{ID}^B = a_{IO}^B + \Omega_{IB}^B \times \Omega_{IB}^B \times r_D + \dot{\Omega}_{IB}^B \times r_D \quad (18)$$

$$= a_{IO}^B + ([\Omega_{IB}^B \times][\Omega_{IB}^B \times] + [\dot{\Omega}_{IB}^B \times])r_D.$$

Accelerometers measure inertial sensed acceleration (sa), not true inertial acceleration (a); these two types of acceleration are related by (see P. G. Savage, Strapdown Analytics', chap. 4.6, 6, 15.2, Strapdown Associates, 2000 section 4.3)

$$sa = a - \frac{G}{m} \quad (19)$$

Where G is the gravitational force acting on the body's total mass m. By subtracting G/m from both sides of equation (18) it is evident that equation (18) holds also for the sensed accelerations $sa_{ID}{}^B$ and $sa_{IO}{}^B$.

By the above observations, the $j^{th}$ IMU (or IN) sensed acceleration measurement model is $$sa_j = (sa_{IB}{}^B)_j + e_{saIN_j} = sa_{IO}{}^B + ([\Omega_{IB}{}^B \times][\Omega_{IB}{}^B \times] + [\dot{\Omega}_{IB}{}^B \times]) r_{I_j} + e_{saIN_j} \quad (20)$$

where both $\Omega_{IB}{}^B$ and $\dot{\Omega}_{IB}{}^B$ apply over the whole body. Thus, when equation (20) is averaged over the M IMUs the following result is obtained for the fused acceleration $\overline{sa}_{IN}$ valid at $\bar{r}_I$:

$$\overline{sa}_{IN} = \frac{1}{M} \sum_{j=1}^{M} sa_j = sa_{IO}^B + ([\Omega_{IB}^B \times][\Omega_{IB}^B \times] + [\dot{\Omega}_{IB}^B \times])\bar{r}_I + \bar{e}_{saIN} \quad (21)$$

where $$\bar{e}_{saIN} = \frac{1}{M} \sum_{j=1}^{M} e_{saIN_j}$$

is the 'mean IN' sensed acceleration error, and its covariance is M times smaller than that of $e_{saIN_j}$, the sensed acceleration error of $IN_j$. In practice, IMUs output (for navigation) velocity and attitude increments, and results similar to eqs. (21) and (17) hold.

Navigation Filter Tuning and Operation

The IN fusion discussion above leads to the following conclusions regarding filter tuning (de-termination of the matrices P0, Q and R, used in the filter) in the proposed scheme:

P0: The {P, V, Θ} terms should reflect the (fused) navigation initialization accuracy. Each IN is individually initialized, but all position initializations are practically derived from one given position, with lever corrections to the IMUs, and all attitude initializations are equal to a given attitude. (If the body is not at rest, there will be Ω×r individual velocity 'corrections' added to one given velocity). Thus, the P, V, Θ terms of the 'fused P0' should equal those of the baseline INS. The {A, Ω} terms, however, should be $$\frac{1}{M}$$

of the respective parameters of a single IMU.

Q: Since for all IN terms it was found that their error covariance is about M times smaller than that of the baseline IN, and since Q represents the covariances of the random processes that drive the IN's error covariance, the 'fused Q' should be $$\frac{1}{M}$$

of the baseline Q.

R: The 'fused R' should be $$\frac{1}{N}$$

of the baseline R.

The fused IN represents $\bar{r}_I$ and the fused GPS represents $\bar{r}_A$. Thus, the GPS data should, before being input to the navigation filter, undergo standard position and velocity lever-corrections using $\bar{r}_{IA}$ (instead of the lever from the single IMU to the single GPS antenna, used in the baseline INS).

Both the aposteriori (after GPS-update) filter-state and the full-state navigation output apply only to the body-point defined by $\bar{r}_I$ (except attitude, which applies throughout the body). Since all the sensors are located elsewhere, computation of individual IMU/IN corrections and individual GPS-aiding requires special attention (see below).

Details regarding the standard computation of the {P, V, Θ}-reset in the navigation filter will not be described here. Note that in the present method (similarly to the baseline navigation scheme), after each GPS-update the integrators for the 'fused {A, Ω}-corrections' are incremented, and then deducted from the current apriori fused {A, Ω}, which are sums of the current individual corrected {A, Ω}, to obtain 'fused filter-corrected' (aposteriori) {A, Ω}.

Individual IMU/IN Corrections Computation

The inertial navigation (IN) module within a standard INS is traditionally associated with two kinds of 'corrections', both performed at the GPS-fix frequency, which is the filter-update rate (and often also the filter-propagation rate), and both are performed after each filter-update.

Note that the {Δθ, Δv} output of the IMU is always corrected before being delivered to the IN; the correction is applied at the IN computation-rate (=IMU-output rate). The {Δθ, Δv} correction terms are integrals of the filter-states regarding {A, Ω} (FIG. 1). The filter-state usually 'exists' only at filter-updates: the state is computed at the filter-update stage, used for IN-corrections, and immediately reset to zero since the IN-corrections carry all the filter's state information.

So, in a standard INS, after each filter-update:
The IN's {P, V, Θ} output is being 'reset', that is overridden, by the corresponding full-state {P, V, Θ}-output of the whole INS (which, at that instant, already optimally incorporates the GPS-update information).
The above-mentioned {Δθ, Δv} IMU-rate correction terms are integrated, that is incremented by the {A, Ω} parts of the aposteriori filter-state.
In the present method, all the above items are individually performed for each IN. See FIG. 2 and the below description.

Individual IN Output Reset
P: Since the filter-updated full-state position-output of the navigation scheme ($P_{r_I}^E$) applies at $r_I$, and the IMUs are located at $r_{I_j}$, the 'reset position' for the $j^{th}$ IMU is $$P_{IN_j}{}^{E(+)} = P_{r_I}{}^E + \hat{C}_B{}^E r_{II_j} \quad (22)$$

where $\hat{C}_B^E$ is the filter-updated DCM-output of the navigation system and (+) indicates (individual) after-reset data.

V:

$$V_{IN_j}^{E(+)} = V_{r_I}^E + \hat{C}_B^E[\hat{\Omega} \times] r_{II_j} \quad (23)$$

where $V_{r_I}^E$ and $\hat{\Omega}$ are the velocity and rate filter-updated full-state outputs of the navigation system.

Θ:

$$C_B^{L_{IN_j}(+)} = \hat{C}_B^E, \ \forall j. \quad (24)$$

Individual IMU Output Correction

Correcting Δθ is based on the fact that $\hat{\Omega}$ is the best-known current angular rate at all body-points, thus we wish to attain $$\Omega_j^{(+)} = \hat{\Omega}, \forall j \quad (25)$$

by manipulating the individual Δθ (or Ω) correction terms. There are two ways to attain this: either directly define the aposteriori 'full' individual Ω-correction as the difference between the current individual raw rate-measurement and $\hat{\Omega}$, thus dispensing with the integrators regarding the rates (more precisely, the rate-error estimation); or maintain rate integrators and define the individual rate-error estimation increment as the difference between the apriori local corrected rate and $\hat{\Omega}$ (this is the option applied in the example). Note that both ways differ from the standard practice (for a single IMU) of incrementing integrators with the appropriate filter-update states, and both lead to 'noisier' (however individual) IMU error-estimations.

Individual Δv (or A) corrections are trickier, since according to equation (18) computation of the linear acceleration at a given body-point, given the linear acceleration of the CG, requires knowing the angular acceleration $\dot{\Omega}_{IB}^B$, which is neither measured nor calculated in INSs. Up to here, it was sufficient to just know that $\dot{\Omega}_{IB}^B$ is the same for the whole body.

One may try to somehow estimate $\dot{\Omega}_{IB}^B$, for example by a filter based on $\hat{\Omega}$. This approach incurs a detrimental time-lag. Instead, the present method applies a novel version of a known technique, (see e.g. S. Merhav, "A Nongyroscopic Inertial Measurement Unit", Journal of Guidance, Vol. 5(3), pp. 227-235, 1982 and R. Hanson, "Using Multiple MEMS IMUs to Form a Distributed Inertial Measurement Unit", Master's Thesis, US Airforce Institute of Technology 2005), that will now be presented.

First, re-write equation (18) by switching sides for $a_{ID}^B$ and $a_{IO}^B$:

$$a_{IO}^B = a_{ID}^B - ([\Omega_{IB}^B \times][\Omega_{IB}^B \times] + [\dot{\Omega}_{IB}^B \times]) r_D.$$

Since the latter holds for any $r_D$, we have for $r_1^B$ and $r_2^B$ $$(a_{IB}^B)_1 - ([\Omega_{IB}^B \times][\Omega_{IB}^B \times] + [\dot{\Omega}_{IB}^B \times]) r_1^B = (a_{IB}^B)_2 - ([\Omega_{IB}^B \times][\Omega_{IB}^B \times] + [\dot{\Omega}_{IB}^B \times]) r_2^B,$$

whence $$(a_1 - a_2)_{IB}^B - ([\Omega_{IB}^B \times][\Omega_{IB}^B \times] + [\dot{\Omega}_{IB}^B \times])(r_1^B - r_2^B) = 0. \quad (26)$$

Examining equation (26) in our context, all IMU-locations are known and the IMUs measure accelerations and angular rates. Thus, (26) applied to any two IMUs is a set of three linear equations from which the angular acceleration 3-vector $\dot{\Omega}_{IB}^B$ can be extracted, as follows: (26) ⇒

$$[\dot{\Omega}_{IB}^B \times](r_1^B - r_2^B) = (a_1 - a_2)_{IB}^B - [\Omega_{IB}^B \times][\Omega_{IB}^B \times](r_1^B - r_2^B).$$

Note that the RHS above is completely known. The LHS can be simplified by noting that for any two vectors $v_1, v_2$ $$v_1 \times v_2 = [v_1 \times] v_2 = -v_2 \times v_1 = -[v_2 \times] v_1.$$

Hence, $$[\dot{\Omega}_{IB}^B \times](r_1^B - r_2^B) = -[(r_1^B - r_2^B) \times]\dot{\Omega}_{IB}^B \Rightarrow [(r_1^B - r_2^B) \times]\dot{\Omega}_{IB}^B = [\Omega_{IB}^B \times][\Omega_{IB}^B \times](r_1^B - r_2^B) - (a_1 - a_2)_{IB}^B. \quad (27)$$

Now, equation (27) in shorthand is $C_{(1,2)} \dot{\Omega}_{IB}^B = D_{(1,2)}$ (the meaning of $C_{(1,2)}$ and $D_{(1,2)}$ is obvious), recognized as the familiar form Cx=D where the vector x is the unknown and the matrix C and vector D are given.

In order to actually apply equation (27), use any two IMU locations $r_{I_k}$ and $r_{I_l}$, where k, l∈{1, ..., M}; replace $a_1$ and $a_2$ by the sensed (measured) accelerations $sa_k$ and $sa_l$; and replace $\Omega_{IB}^B$ by the best-known current body-rate estimation $\hat{\Omega}$:

$$[(r_{I_k} - r_{I_l}) \times]\dot{\Omega}_{IB}^B = [\hat{\Omega} \times][\hat{\Omega} \times](r_{I_k} - r_{I_l}) - (sa_k - sa_l). \quad (28)$$

Since $sa_k$ and $sa_l$ and even $\hat{\Omega}$ contain biases and noises, the solution of equation (28) for $\dot{\Omega}_{IB}^B$ is erroneous to some extent. In order to minimize this error it is proposed to gather the available data from all the IMUs and obtain a minimum-variance least-squares solution for $\dot{\Omega}_{IB}^B$, as follows:

Equation (28) can be written with any two IMUs. Apply eq. (28) to all possible IMU-pairs, concatenate the q=M(M−1)/2 resulting equations into one over-determined equation, and solve it by a least-squares procedure. The details: shorthand (28) as $\tilde{C}_{(k,l)} \dot{\Omega}_{IB}^B = \tilde{D}_{(k,l)}$, or $\tilde{C}_p \dot{\Omega}_{IB}^B = \tilde{D}_p$, where p∈{1, ..., q} is one pair of IMUs. The concatenated equation is then $$\tilde{C} \dot{\Omega}_{IB}^B = \tilde{D}, \ \tilde{C}_{3q \times 3} = \begin{bmatrix} \tilde{C}_1 \\ \vdots \\ \tilde{C}_q \end{bmatrix}, \tilde{D}_{3q \times 1} = \begin{bmatrix} \tilde{D}_1 \\ \vdots \\ \tilde{D}_q \end{bmatrix}. \quad (29)$$

The least-squares solution of equation (29) is $\hat{\dot{\Omega}} = (\tilde{C}^T \tilde{C})^{-1} \tilde{C}^T \tilde{D}$. Note that the matrix inversion only involves a 3×3 matrix. Since there is a simple closed-form analytic way to invert a 3×3 matrix, the matrix inversion and the whole least-squares solution are not computation-intensive.

To finalize, now that the body's angular acceleration is known it is possible to compute the individual IMU-output A-correction. Since equation (28) applies to any two body-points, choose point l to be the 'mean IMU', choose point k to be the $j^{th}$ IMU, and solve for $sa_j$:

$$sa_j = [\hat{\Omega} \times][\hat{\Omega} \times](r_{I_j} - \bar{r}_I) + sa_I - [(r_{I_j} - \bar{r}_I) \times]\hat{\dot{\Omega}} \quad (30)$$

$$= [\hat{\Omega} \times][\hat{\Omega} \times](r_{II_j}) + sa_I - [(r_{II_j}) \times]\hat{\dot{\Omega}}$$

$$= sa_I + ([\hat{\Omega} \times][\hat{\Omega} \times] + [\hat{\dot{\Omega}} \times]) r_{II_j}.$$

Here, $sa_I$ is the fused filter-corrected (aposteriori) sensed acceleration at $\bar{r}_I$ (see the last paragraph in subsection "NAVIGATION FILTER TUNING AND OPERATION" above).

Individual acceleration-corrections can now be computed in two ways (see the two individual rate-correction ways in the paragraph following equation (25)): with or without integrators.

An individual error-estimation A-increment applicable to the IMU at $r_{I_j}$ can be defined as the difference between the apriori local corrected acceleration and the aposteriori 'full' $sa_j$ of equation (30). Each individual A-integral is advanced, after a GPS-update, by its applicable individual A-increment. This is the approach applied in the example below. Alternatively, define the aposteriori 'full' individual A-correction as the difference between the current individual raw acceleration-measurement (=IMU-output) and $sa_j$, and dispense with the integrators regarding the acceleration-errors estimation.

Both ways differ on two counts from the standard practice (for a single IMU): because of the angular rate/acceleration lever-arm correction terms, and because of the use of local 'best-known' aposteriori acceleration ($sa_j$) to define the local increments (for the integrators), rather than using filter-update states. The resulting A-error estimations are 'noisier' than customary for a single IMU, however truly individual.

Individual GPS-Aiding Computation

The $\{P, V, \Theta, \Omega\}$ individual aiding items to the GPS receivers, which can be sent at IN-rate, are computed similarly to equations (22)-(25) except with $r_{LA_j}$ in lieu of $r_{I_j}$. The A-aiding individual items are computed by (see equation (30))

$$sa_i = sa_j + ([\hat{\Omega}\times][\hat{\Omega}\times] + [\dot{\hat{\Omega}}\times])r_{LA_j} \quad (31)$$

During GPS Outage

When GPS signals become unavailable, after having been available for some time during the navigation, the system continues navigating like any standard INS, that is with pure-inertial navigation using the latest (and 'frozen') IMU-corrections. In fact, each IN within the system individually does that, and IN fusion goes on regardless of GPS status.

With GPS data, navigation performance regarding the 'mean IMU' location (or 'IMUs center') $\bar{r}_I$ is much better than that of the baseline INS (regarding its single IMU location). In fact, it is up to about $\sqrt{MN}$ times better due just to the reduced noises; and the individual sensor-corrections significantly improve upon that. During GPS outage, navigation is better that of the baseline INS both because residual IMUs' errors are smaller and because the 'initial conditions' of the pure-inertial navigation are more accurate.

However, the invention has an additional useful feature that is applicable during GPS outages: though navigation accuracy unavoidably deteriorates during the outage, the fused navigation solution is always significantly better than that of any individual IN within the system. Thus, individual IN-output reset (see equations (22)-(24)) can still be performed, for improved $\{P, V, \Theta\}$ navigation data regarding all $r_{I_j}$. ($P_{r_{I_t}}^E$, $V_{r_{I_t}}^E$, $\hat{C}_B^E$ and $\hat{\Omega}$ are in such a case just the fused respective variables, not filter-updated.) This may be practically important, for example when an optical sensor is located near an IMU. Needless to say, individual IN-output resets during GPS outage do not improve the ensemble navigation regarding $\bar{r}_I$.

Note that $r_{I_j}$ multiplies $\hat{C}_B^E$, which is not perfectly accurate, so that a 'very large' $r_{I_j}$ is not advisable (even with GPS data).

Simulation Example

The numerical simulation example described below demonstrates the main features of the invention, with several IMUs and a single GPS receiver, and compares the invention's performance to the performance of an (almost) identical navigation scheme (with the same hardware), however lacking the individual IMU corrections.

The main reason for using one GPS receiver in the example, rather than several receivers, is the wish to highlight the contribution of the individual IMUs corrections. The approach to which the invention is compared applies (like the invention) full inertial navigation for each IMU, including individual initializations and individual PVΘ filter-resets. That is, the compared approach is significantly more involved than the basic multi-IMU approach, which consists in averaging the IMUs' outputs and running a single IN. The compared approach differs from the invention only in that it applies the same navigation filter acceleration and rate corrections to all the IMUs (rather than individual corrections to each IMU, in the invention).

The (simulated) hardware configuration used in all the navigation simulations includes five ADIS16648 low-grade IMUs, manufactured by ANALOG DEVICES. Four of these IMUs are 'placed' at the four vertices of a tetrahedron whose edge length is 0.2 meter; one IMU is 'placed' at the tetrahedron's center. (See R. Hanson, "Using Multiple MEMS IMUs to Form a Distributed Inertial Measurement Unit", Master's Thesis, US Airforce Institute of Technology, 2005), for a discussion of IMU-arrangement effects. The simulation includes modelling of individual IMU locations and misalignments, and of individual bias/scale-factor/random-walk errors (based on the ADIS16448's specification) for each of the 30 sensors (an IMU includes an accelerometer triad and a rate-gyro triad). A second hardware configuration tested was a collapsed version of the first, with all IMUs co-located. For fairness, the same random sequences were used in the simulation runs with the compared approach.

A 3-minute trajectory of a rocket was used, which includes the boost phase (about 20 seconds) and a portion of the ballistic phase. GPS reception is available for the first 2 minutes. Note that the attitude accuracy of navigation in a high-altitude ballistic trajectory is usually poor.

FIG. 5 presents position, velocity and attitude errors in a single simulation run for the two compared navigation schemes, and for two hardware (HW) configurations: tetrahedron+center and co-located IMUs. In the first 120 seconds the GPS dominates navigation accuracy and all four runs exhibit practically identical performance. During the GPS outage (from 120 to 180 seconds; see FIG. 6), a clear advantage of the invention is apparent, with about half the errors of the compared approach (with a small advantage for the non co-located configuration, but not in attitude). Hence, in this example individual IMU corrections are equivalent to using (in the compared approach) about a four-fold number of IMUs (20 IMUs). Since the compared approach is significantly more advanced than mere IMUs-averaging, the advantage of the invention over IMUs-averaging is even greater.

The reason for this success can be seen in FIG. 7, which addresses one of the off-center IMUs in the simulation runs made for FIG. 5, and presents for each of this IMU's six sensors the total true error (excluding random walk, for clarity) and the error estimations made by the two compared methods (note: after t=120 the estimations are 'freezed'). The variables presented are velocity and angle increments;

the plots pertaining to the X and Z velocity-increments are zoomed-in. Though the invention does not provide flawless error estimations, it still does much better than the compared approach, which applies the same filter-corrections to all IMUs. Note the distinctly better estimations regarding the Y accelerometer and X and Z rate-gyros. The Z accelerometer estimation is also significantly better. The X accelerometer estimation captures the true error dynamics, while the compared approach misses the latter altogether.

The invention and the compared approach have also been statistically compared by Monte-Carlo simulation runs. The resulting horizontal position navigation accuracies, in terms of CEP and R95, are presented in FIG. 8, which zooms in on the GPS outage period. In this MC simulation, the invention is twice as accurate as the compared approach, regarding both CEP and R95.

FIG. 9 shows the respective 50% and 95% 3-dimensional attitude accuracy measures, and also zooms in on the GPS outage period. The shown attitude accuracy is poor because of the ballistic high-altitude flight condition. Regarding attitude accuracy, the 50% measures of the invention and the compared approaches are quite similar; however, the 95% attitude accuracy measure of the invention is far better (2.7 times better at t=180 seconds) than that of the compared approach. This means that the attitude error-distribution of the present method is much narrower than that of the compared method. Note again that the compared approach would require about 20 IMUs (rather than 5 IMUs) to attain the position accuracy of the invention, and that IMUs-averaging (the basic approach to multi-IMU navigation) would require even more IMUs.

Obviously, one can run both an inertial navigation scheme and an individual navigation filter per IMU, and fuse their outputs (see I. Rapoport, A. Brandes and H. Kraus, "Optimal Fusion of Multiple Sensors with a Common External Update", Proceedings of the 53rd Israel Annual Conference on Aerospace Sciences, Tel-Aviv & Haifa, Israel, March 2013, N. A. Carlson, "Information-Sharing Approach to Federated Kalman Filtering", Proceedings of the 1988 IEEE National Aerospace and Engineering Conference (NAECON 88), p. 1581, Dayton, Ohio, 1988, and N. A. Carlson, "Federated Filter for Distributed Navigation and Tracking Applications", ION $58^{th}$ AM, pp. 340-353, 2002) to attain performance similar to that of the invention, perhaps even better. However, the associated real-time code, and the resulting computational load would all be much greater than with the present invention.

What is claimed is:

1. A GPS-aided inertial navigation method comprising: providing multiple sensors including multiple inertial measurement units (IMUs) and at least one global positioning system (GPS), each GPS comprising a receiver and an antenna, said IMUs and at least one GPS being fixedly installed on a rigid body, said at least one GPS providing position and velocity solutions; and
   providing a computer with navigation software;
   wherein the computer performs the following activities:
   (a) interfacing with all IMUs and all GPS receivers;
   (b) running, in parallel, multiple standard inertial navigation (IN) schemes, one per each IMU;
   (c) computing a mean of all the INs, thus obtaining a fused IN solution for a mean location of the IMUs;
   (d) computing a mean of all the GPS solutions, thus obtaining a fused GPS solution for a mean location of the GPS antennas;
   (e) applying lever-arm corrections, with the vector from the mean location of the IMUs to the mean location of the GPS antennas;
   (f) feeding the fused IN solution and the lever-arm corrected fused GPS solution, regardless of whether the fused GPS solution is based on a single GPS or multiple GPSs of the at least one GPS, to a single navigation filter, and the single navigation filter operates with the same number of filter states as it would with a single IMU/IN and a single GPS;
   (g) computing angular acceleration of the rigid body; and
   (h) running an IMU/IN/GPS correction module which, based on rigid-body physics and on the computation of the angular acceleration of the rigid body, computes appropriate individual:
      (i) linear acceleration and angular rate corrections for each IMU,
      (ii) position, velocity and attitude corrections for each IN, and
      (iii) position, velocity, attitude, linear acceleration and angular rate aiding-message for each GPS receiver.

2. The method of claim 1, wherein the rigid body's angular acceleration is computed using a least-squares method, using data from all the IMUs.

3. The method of claim 2, wherein, for computation purposes, the IMUs are paired in all possible IMU pairs and the least-squares method uses linear acceleration and angular rate data from all of said IMU pairs.

4. The method of claim 1, wherein individual IMU-corrections are computed as increments to prior corrections, and mathematically integrated.

5. The method of claim 1, wherein individual IMU-corrections are computed entirely anew after each navigation filter update, without mathematical integration.

6. The method of claim 1, wherein the computation of individual corrections to all the sensors uses:
   a. angular rate and angular acceleration lever-arm correction terms, and
   b. filter-updated and lever-corrected linear accelerations at the individual locations of the IMUs, to define either local IMU correction-increments or to define whole local IMU corrections.

7. The method of claim 1, wherein at least one of the IMUs and the GPS antennas are not co-located.

8. The method of claim 7, wherein all of the IMUs and the GPS antennas are not co-located.

9. The method of claim 1, wherein the number of IMUs and the number of GPSs are independent of each other.

10. A GPS-aided inertial navigation system (INS) comprising multiple sensors including multiple inertial measurement units (IMUs) and a computer with navigation software, and at least one global positioning system (GPS), each GPS comprising a receiver and an antenna, said IMUs and at least one GPS being fixedly installed on a rigid body, said at least one GPS providing position and velocity solutions, and wherein the computer is configured to:
   (a) interface all IMUs and all GPS receivers;
   (b) run, in parallel, multiple standard inertial navigation (IN) schemes, one per each IMU;
   (c) compute a mean of all INs, thus obtaining a fused IN solution for a mean location of the IMUs;
   (d) compute a mean of all the GPS solutions, thus obtaining a fused GPS solution for a mean location of the GPS antennas;
   (e) apply lever-arm corrections, with the vector from the mean location of the IMUs to the mean location of the GPS antennas;

(f) feed the fused IN solution and the lever-arm corrected fused GPS solution regardless of whether the fused GPS solution is based on a single GPS or multiple GPSs of the at least one GPS, to a single navigation filter, and the single navigation filter operates with the same number of filter states as it would with a single IMU/IN and a single GPS;

(g) compute angular acceleration of the rigid body; and (h) run an IMU/IN/GPS correction module which, based on rigid-body physics and on the computation of the angular acceleration of the rigid body, computes appropriate individual:
  (i) linear acceleration and angular rate corrections for each IMU,
  (ii) position, velocity and attitude corrections for each IN, and
  (iii) position, velocity, attitude, linear acceleration and angular rate aiding-messages for each GPS receiver.

11. The system of claim 10, wherein the computer computes the rigid body's angular acceleration using a least-squares method, using data from all the IMUs.

12. The system of claim 11, wherein using data from all the IMUs further comprises using respective locations of the IMUs fixedly installed on the rigid body.

* * * * *